United States Patent [19]

Kornoelje et al.

[11] 3,963,265
[45] June 15, 1976

[54] ANTI-JACKKNIFE MECHANISM

[75] Inventors: Robert E. Kornoelje, Wyoming; Dale Van Der Kolk, Hudsonville, both of Mich.

[73] Assignee: Robert E. Kornoelje, Wyoming, Mich.

[22] Filed: June 5, 1975

[21] Appl. No.: 584,137

[52] U.S. Cl............................ 280/432; 280/434
[51] Int. Cl.² ................................... B62D 53/08
[58] Field of Search......... 280/432, 434, 435, 446 B

[56] References Cited
UNITED STATES PATENTS

| | | | |
|---|---|---|---|
| 2,610,069 | 9/1952 | Ketel | 280/434 |
| 2,959,429 | 11/1960 | Lavelle | 280/432 |
| 3,031,205 | 4/1962 | Fox | 280/432 |
| 3,640,549 | 2/1972 | Neff et al. | 280/435 |

Primary Examiner—M. H. Wood, Jr.
Assistant Examiner—John A. Pekar
Attorney, Agent, or Firm—Price, Heneveld, Huizenga & Cooper

[57] ABSTRACT

Anti-jackknife mechanism for a fifth wheel coupler between a towing tractor and a towed trailer, including a vertically shiftable stop member engageable with abutment elements on opposite sides of the coupler kingpin, the stop member being tripped into operative position with coupling of the coupler to a kingpin. The stop member can be shifted temporarily to inoperative position, as for sharp angle maneuvering of the trailer.

9 Claims, 12 Drawing Figures

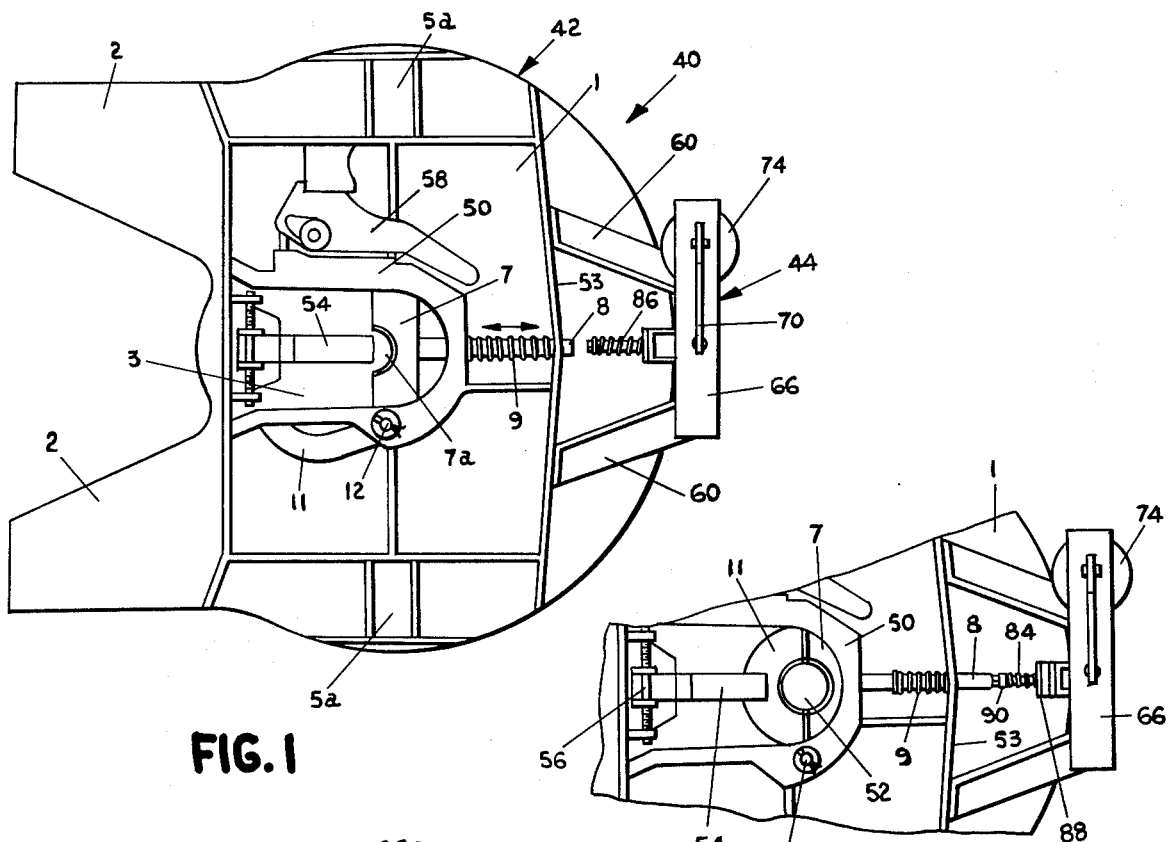
FIG. 1
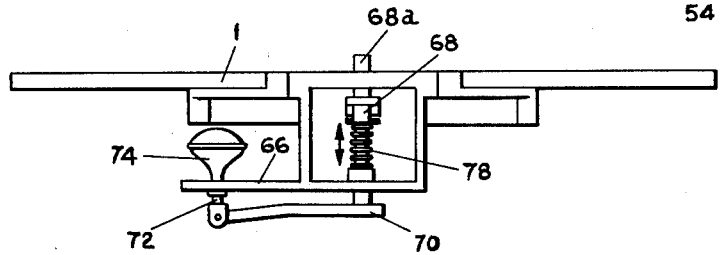
FIG. 2
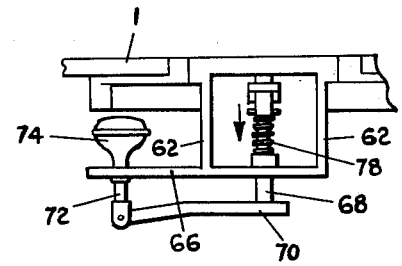
FIG. 3
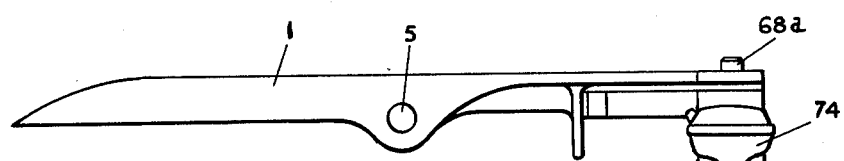
FIG. 4
FIG. 5
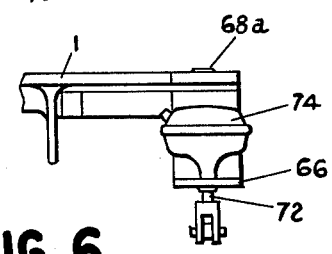
FIG. 6

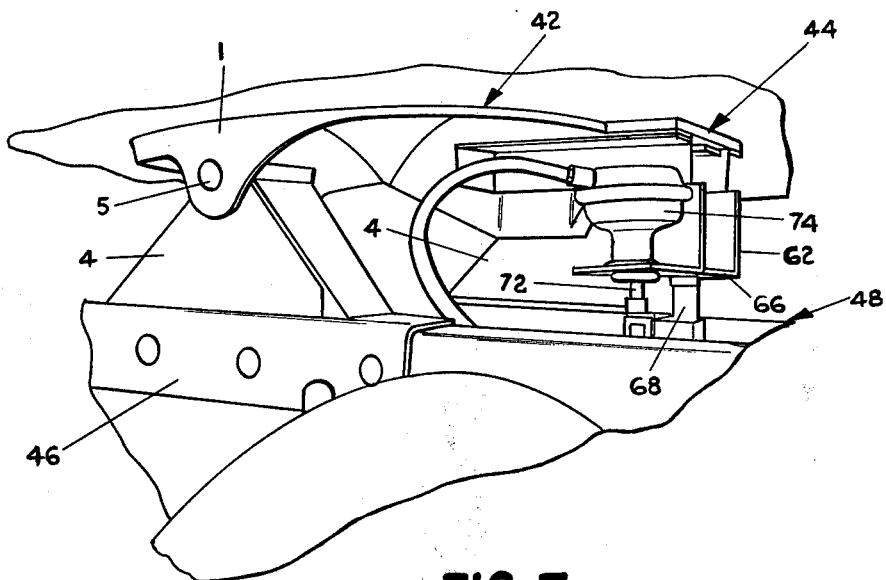
FIG. 7
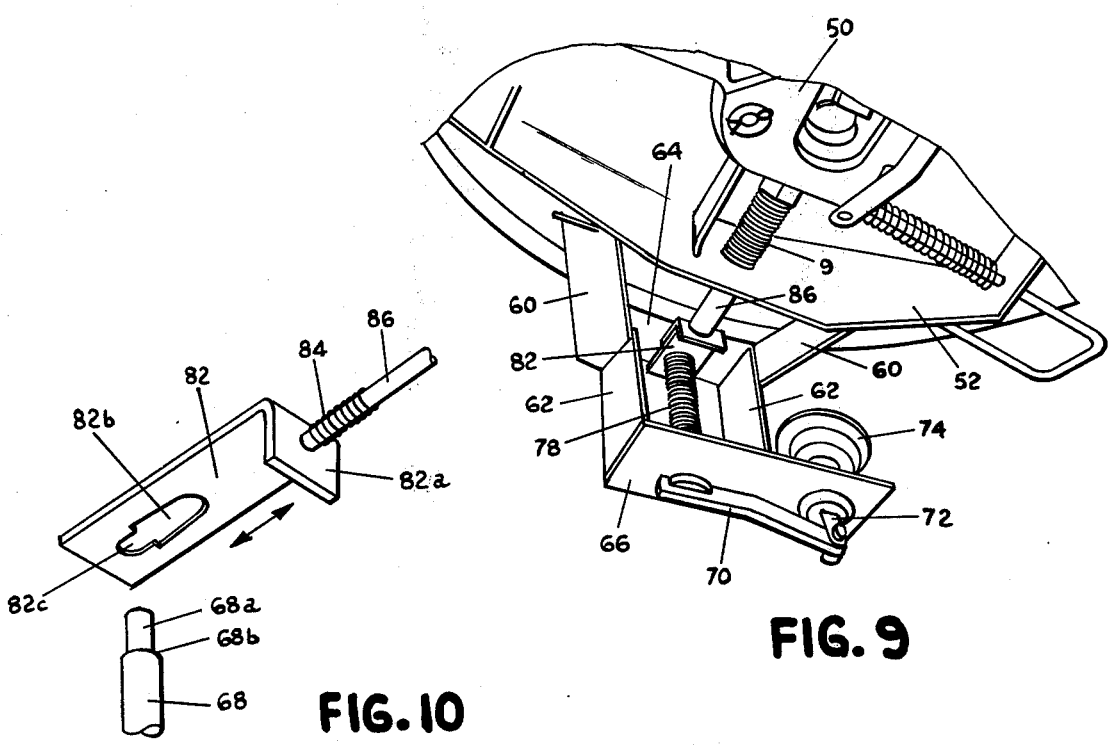
FIG. 9
FIG. 10

3,963,265

ANTI-JACKKNIFE MECHANISM

BACKGROUND OF THE INVENTION

This invention relates to anti-jackknife mechanism for a fifth wheel hitch assembly between a tractor and a trailer.

The safest and most reliable coupler assembly for hauling a trailer behind a truck tractor is the widely used so-called fifth wheel hitch. It normally provides excellent control over the trailer behind the tractor. However, there are times of emergency when the trailer shifts out of alignment with the towing tractor, as on slippery surfaces or the like. Once the trailer shifts to an angle of greater than about 15° from alignment behind the tractor, the violent forces resulting tend to throw the tractor-trailer combination out of control in a so-called jackknife condition. Once this condition occurs, the vehicle is totally out of control and extremely dangerous.

Several anti-jackknife mechanisms have been devised over the last several decades in efforts to prevent or inhibit this condition. Unfortunately, many of them were not effective. Those which are in use tend to be complex and expensive.

SUMMARY OF THE INVENTION

A primary object of this invention is to provide an improved anti-jackknife apparatus having an effective yet simple construction. Coupling of the fifth wheel to a kingpin automatically activates the anti-jackknife mechanism to operative condition, such that the driver need not remember to take special efforts to do this. When so operative, the mechanism has no effect on vehicle handling until and unless the trailer shifts out of alignment with the tractor a predetermined amount, e.g. about 15°. The unit can be rendered temporarily inoperative by the driver to allow sharp angle trailer positioning or maneuvering.

Another object of this invention is to provide an anti-jackknife mechanism having the above attributes and readily attachable to an existing fifth wheel assembly, such that existing equipment in use can be quickly, easily, and inexpensively equipped with the anti-jackknife safety feature.

These and other objects, advantages and features of the invention will become apparent upon studying the following description in conjunction with the drawings.

BRIEF DESCRIPTION OF THE DRAWINGS

FIG. 1 is a bottom view of a fifth wheel hitch in combination with the novel anti-jackknife mechanism;

FIG. 2 is a fragmentary bottom view of the apparatus in FIG. 1, showing the fifth wheel coupler connected to a kingpin;

FIG. 3 is a front elevational view of the mechanism in FIG. 1;

FIG. 4 is a front elevational view of the mechanism in FIG. 2;

FIG. 5 is a side elevational view of the mechanism in FIG. 1;

FIG. 6 is a fragmentary side elevational view of the mechanism in FIG. 2 and FIG. 4;

FIG. 7 is a perspective view of the combination in FIG. 1 shown between a tractor and trailer assembly;

FIG. 9 is a fragmentary, somewhat enlarged, bottom perspective view of the apparatus in FIG. 1;

FIG. 10 is an enlarged view of a portion of the anti-jackknife device;

DESCRIPTION OF THE PREFERRED EMBODIMENT

Figure 12:
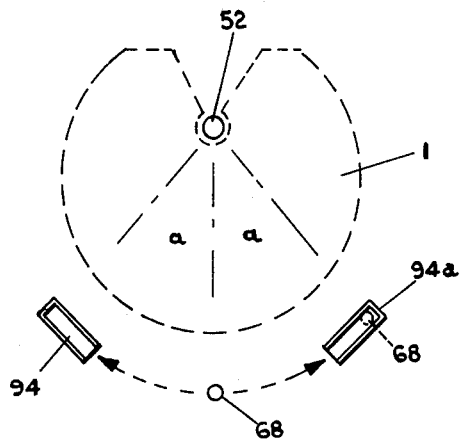
FIG. 12 is a schematic view of the fifth wheel coupler and the stop elements of the anti-jackknife device.

Referring now specifically to the drawings, the combination 40 includes a fifth wheel subassembly 42 and an anti-jackknife subassembly 44 mounted thereon at the forward end thereof.

Fifth wheel subassembly 42 is basically of the construction set forth in U.S. Pat. No. 2,610,069 which is incorporated by reference herein. It includes a body 1 having at its rear, two spaced apart legs 2 of which the inner edges converge toward each other forwardly, to join a slot 3 at the center portion of the body and open on the rear end. The forward inner end of the slot is closed and has a generally semi-circular configuration as shown in FIG. 1. The body forms a bearing surface or plate on its upper side, and is normally mounted upon two spaced supporting brackets 4 (FIG. 7) which in turn are rigidly connected to the chassis 46 of a truck tractor 48. The pivotal mounting of body 1 to brackets 4 can be with a single shaft 5 extending through both pivots, or alternatively a pair of pins or shafts 5 which extend through bearings 5a (FIG. 1) on the fifth wheeh coupler plate body 1, both of these modes being conventional.

At the inner closed end of slot 3 is a head or jaw element 7 having a semi-circular recess 7a facing rearwardly. A shaft or bar 8 of generally cylindrical shape or the like projects forwardly from element 7 through the cross leg of a U-shaped guide bracket 50 and also slidably through a cross rib 53 depending beneath body 1. Element 7 and its shaft 8 are shiftable toward the front of the coupler body against the bias of a compression spring 9 coiled around shaft 8 and extending between the cross leg of element 50 and flange 53. Forward movement of element 7 causes the second jaw or holding lever 11 to pivot about its pivot pin 12 into engagement with element 7, to retain a kingpin 52 between the jaws. A locking lever 58 is pivotally shiftable to lock element 11 in latched condition. Element 11 preferably is provided with a safety stop or stop block 54 pivotally mounted on cross pin 56 in the mouth of slot 3. This detailed structure of the fifth wheel coupler subassembly 42 is conventional.

The novel anti-jackknife subassembly 44 cooperates with this structure and particularly with the forwardly shiftable shaft 8 connected to coupler jaw 7.

Subassembly 44 includes support elements 60 which are secured as by welding to the fifth wheel coupler at rib 53 and to the underside of plate body 1. Between legs 60 is a frame (FIG. 9) which includes a pair of vertical legs 62 connected at the top by a cross leg 64 and at the bottom by a cross leg or plate 66. A vertically oriented lock pin element 68 extends slidably through plates 66 and 64, between the spaced plates or legs 62. An arm 70 is fixedly secured to the lower end of pin 68, and to the opposite end of which arm is pivotally mounted the extended rod 72 of a fluid actuator 74 secured to plate 66. Around pin 68 is a compression coil spring 78 which biases the pin and arm 72 to an elevated position (FIG. 3) wherein the upper end 68a of pin 68 projects above the top bearing surface of fifth wheel plate or body 1. Actuation of fluid actuator 74 shifts its extended rod 72 downwardly to lower arm 70 and pin 68 against the bias of compression spring 78 as in FIG. 4. This retracts the upper end 68a of pin 68 downwardly out of operative position (FIG. 4).

Pin 68, when lowered by fluid actuator 74 to the position in FIG. 4, is latched into this position by a shiftable latch plate 82. Latch plate 82 is positioned beneath the undersurface of body 1 and is shiftable forwardly and rearwardly, being biased into a rearward position by a compression coil spring 84 wrapped around a trigger shaft 86. Shaft 86 is secured to a downwardly projecting leg 82a of plate 82 (FIG. 10) and extends through a fixed guide plate 88. Coil spring 84 is retained between plate 88 and an enlarged spring retainer 90 around the free end of trigger pin 86 (FIG. 2). This trigger pin is aligned with shaft 8 of the coupler jaw 7 to be axially abutted thereby on its rear axial end by the forward axial end of shaft 8 when shaft 8 moves forwardly upon engagement of element 7 with a kingpin during the coupling action of a truck trailer with the truck tractor. Plate 82 includes an aperture 82b (FIG. 10) therethrough, one end portion 82c of the aperture being smaller in diameter than the remaining portion of the aperture 82b. Pin 68 has a smaller diameter upper portion 68a which is sized to project through smaller aperture portion 82c until the larger shoulder 68b engages the surrounding portion of plate 82. The shoulder 68b and lower portion of pin 68 are larger than aperture portion 68c but smaller than the remaining aperture portion 68b. Slidably shifting plate 82 forwardly by engagement of moving shaft 8 with trigger shaft 86 shifts the larger aperture portion 82b into alignment with stop pin 68, to allow the stop pin to project further upwardly under the bias of compression spring 78, to cause pin upper end 68a to project above the coupler plate 1 into operative position as depicted in FIGS. 3 and 5.

Figure 11:
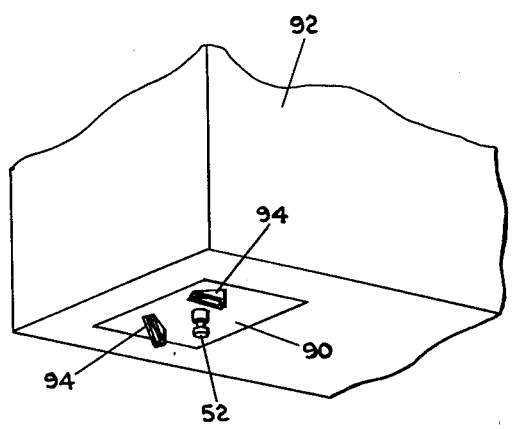
FIG. 11 is a fragmentary, perspective view of the underside front end of a truck trailer of the apparatus.
Figure 8:
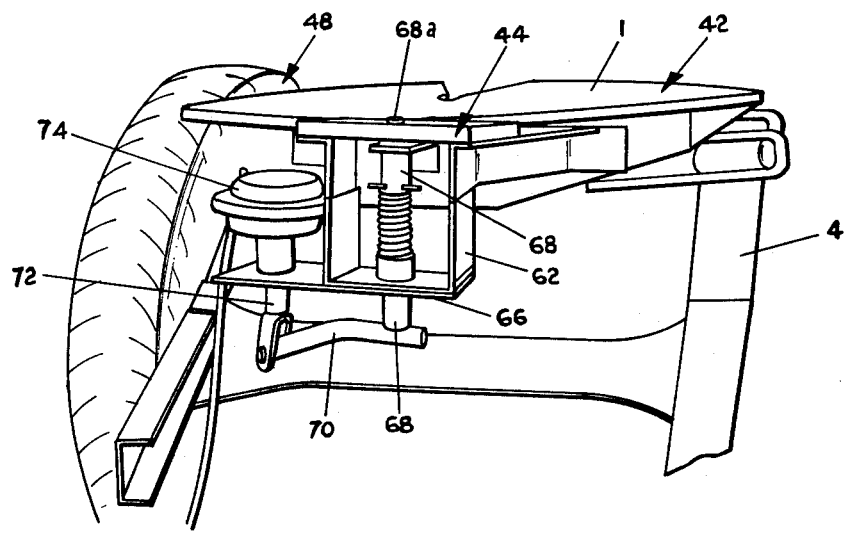
FIG. 8 is a perspective front view of the combination in FIG. 1 on a truck tractor.

Angular movement between the truck tractor and the truck trailer causes relative movement of stop pin 68 relative to the trailer in an arcuate motion illustrated schematically in FIG. 12. Affixed to the kingpin mounting plate 90 on the underside of the front end of trailer 92 is a pair of stops 94 (FIG. 11). These are spaced from each other in generally straddling relationship with the kingpin 52, forwardly thereof and at a predetermined acute angle $a$, e.g. about 15° or so, from a longitudinal line bisecting the kingpin. Each stop is preferably channel-shaped for strength, opening downwardly, including an abutment 94a at its outer end for engagement with stop pin 68, if and when the angular relationship between the tractor and trailer reaches the predetermined angle $a$.

In operation, assuming that the fifth wheel coupler is not connected to a kingpin on a trailer, so that jaw element 7 is in its rearward position, and jaw element 11 is open as in FIG. 1, and assuming that stop pin 68 is held in its lowered inactive condition (FIG. 4) by latch plate 82 in its rearward position, if the fifth wheel coupler is connected to kingpin 52 in conventional fashion, i.e. by the tractor and its fifth wheel being backed beneath the forward portion of trailer 92 until kingpin 52 moves between arms 2 and into slot 3 where it engages with recess 7a of element 7, this shifts element 7 and its shaft 8 forwardly, and simultaneously shifts jaw 11 to a closed position as in FIG. 2. As shaft 8 shifts forwardly, its forward axial end engages the rearward axial end of trigger pin 86, shifting it against the bias of its compression spring 84, and thus shifting latch plate 82 forwardly to align the enlarged aperture portion 82b with the upper end 68a of stop pin 68.

The stop pin 68 is thus released from the latch plate, and, due to the bias of compression spring 78, is shifted to its raised or elevated position illustrated in FIGS. 3 and 5, to be engageable with the abutment elements 94a of stop members 94 secured to the underside of mounting plate 90. This automatic shifting of the stop pin into an operative safety condition during coupling to the trailer makes it unnecessary for the driver to have to purposely activate the safety device. Then, if for some reason the tractor and trailer should begin to move into an angular relationship approaching an uncontrolled jackknife condition, the safety stop pin 68 will encounter an abutment 94a and prevent this from occuring.

If it becomes necessary for the driver to purposely turn the tractor at an angle greater than 15° relative to the trailer, as for example in maneuvering trailers in a yard, he can deactivate the anti-jackknife mechanism simply by opening a valve to operate fluid actuator 74, thereby shifting its extended rod 72 and arm 70 downwardly, to lower pin 68 from a position where it would engage the stop elements 94. When he subsequently disconnects the tractor from the trailer, the shaft 8 will shift forwardly, releasing trigger pin 86. Thus, lowering of pin 68 by actuator 74 will enable the latch plate 82 to latch the stop pin in its lowered position.

It is conceivable that certain variations in the structure could be made within the concept set forth and illustrated by the particular preferred embodiment depicted and described in detail. Thus, for example, the jaws of the fifth wheel coupler could be modified in various ways and could be mounted in different fashions as is conventionally done, while still allowing a shaft to shift rearwardly for actuation of the trigger shaft of the anti-jackknife device during coupling. As one illustration of such a modification, the anti-jackknife subassembly 44 could be mounted on the forward end of a fifth wheel structure set forth for example in U.S. Pat. No. 3,640,549 incorporated by reference herein. Thus, shifting of the yoke shaft 30c of the apparatus in that patent would cause the trigger shaft 86 to be shifted for shifting the latch plate and allowing the stop pin to be elevated to its operative condition. Thus, the invention is intended to be limited only by the scope of the appended claims and the reasonably equivalent structures to those defined therein, rather than to any particular illustrative embodiment thereof.

The embodiments of the invention in which an exclusive property or privilege is claimed are defined as follows:

1. For use with a fifth wheel coupler and kingpin between a towing tractor and a towed trailer, anti-jackknife apparatus for attachment to a fifth wheel coupler having a bearing plate, locking coupler jaws, and a shaft shiftable forwardly during coupling, comprising:
   support structure with mounting means for attachment to the front of a fifth wheel coupler; a stop member shiftable normal to the coupler bearing plate, between a lowered inoperative position and a raised operative position; abutment means mountable to a trailer on opposite sides of the kingpin for engagement by said stop member in its raised position, biasing means for biasing said stop member to said raised operative position; latch means for restraining said stop member in said lowered inoperative position; latch trip means for said latch means for tripping said latch means and thereby enable said biasing means to shift said stop member to said raised operative position, said tripping means including shaft engaging means for actuation of said tripping means by the shiftable shaft.

2. The anti-jackknife apparatus in claim 1 including power actuator means connected to said stop member for shifting said stop member temporarily to said lowered inoperative position.

3. The apparatus in claim 1 wherein said latch means is shiftable between latching and non-latching positions, including biasing means applying a biasing force to said latch means toward said latching position.

4. The apparatus in claim 3 wherein said latch means comprises a latch plate engageable with said stop member, and having orifice means to allow projection of said stop member therethrough for shifting to said non-latching position.

5. The apparatus in claim 1 wherein said shiftable shaft is operably associated with one of said locking coupler jaws to shift during coupling of said jaws to a kingpin.

6. A fifth wheel coupler, kingpin, and anti-jackknife assembly comprising:
a fifth wheel coupler having a bearing plate, a pair of locking jaws, and a forwardly extending shaft shiftable during coupling; a kingpin for engagement with said coupler; an anti-jackknife subassembly including support structure secured to said coupler, a stop member shiftable normal to said coupler bearing plate between a lowered inoperative position and a raised operative position; biasing means for biasing said stop member to said raised operative position; latch means for restraining said stop member in said lowered inoperative position; latch trip means for said latch means for tripping said latch means to thereby enable said biasing means to shift said stop member to said raised operative position, said tripping means including shaft engaging means for actuation of said tripping means by the shifting shaft; and abutment means mountable to a trailer on opposite sides of the kingpin for engagement by said stop member in its raised position.

7. The assembly in claim 6 wherein one of said locking jaws is shiftable upon engagement by the kingpin during coupling, and is operably connected to said shifting shaft to cause said latch trip means to trip said latch means.

8. The assembly in claim 7 wherein said latch means is shiftable between latching and non-latching positions, including biasing means applying a biasing force to said latch means toward said latching position.

9. The assembly in claim 8 wherein said latch means comprises a latch plate engageable with said stop member, and having orifice means to allow projection of said stop member therethrough for shifting to said non-latching position.

* * * * *